(12) United States Patent
Seymour et al.

(10) Patent No.: US 9,073,433 B2
(45) Date of Patent: Jul. 7, 2015

(54) VEHICLE CONTROL SYSTEM

(75) Inventors: Shafer Seymour, Bartlett, IL (US); Robert Gee, Lake Barrington, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 112 days.

(21) Appl. No.: 13/215,306

(22) Filed: Aug. 23, 2011

(65) Prior Publication Data
US 2013/0054048 A1    Feb. 28, 2013

(51) Int. Cl.
*B60K 35/00* (2006.01)
*G06K 17/00* (2006.01)
*B60K 37/06* (2006.01)
*G06F 17/00* (2006.01)

(52) U.S. Cl.
CPC ............ *B60K 35/00* (2013.01); *G06F 17/00* (2013.01); *B60K 37/06* (2013.01); *B60K 2350/1004* (2013.01); *B60K 2350/1012* (2013.01); *B60K 2350/1016* (2013.01); *B60K 2350/1024* (2013.01); *B60K 2350/1028* (2013.01); *B60K 2350/1032* (2013.01); *B60K 2350/104* (2013.01); *B60K 2350/1044* (2013.01); *B60K 2350/1052* (2013.01); *B60K 2350/1072* (2013.01); *B60K 2350/108* (2013.01); *B60K 2350/2013* (2013.01); *B60K 2350/2065* (2013.01); *B60K 2350/352* (2013.01)

(58) Field of Classification Search
CPC ........ G06F 17/00; B60K 35/00; B60K 37/06
USPC ........................................... 701/1
See application file for complete search history.

(56) References Cited

U.S. PATENT DOCUMENTS

| 4,731,769 A | | 3/1988 | Schaefer et al. |
| 5,214,707 A | * | 5/1993 | Fujimoto et al. ............... 704/275 |
| 6,119,060 A | * | 9/2000 | Takayama et al. ............... 701/36 |
| 2007/0067088 A1 | * | 3/2007 | Baig ............................... 701/96 |

(Continued)

FOREIGN PATENT DOCUMENTS

| DE | 10159477 A1 | 7/2003 |
| DE | 102005059449 A1 | 6/2007 |

(Continued)

OTHER PUBLICATIONS 2012 300 2012 Owner's Manual 300 Chrysler Group LLC 12C481-126-AA First Edition Printed in U.S.A.905579_300_OM cover. indd 1 Mar. 15, 2011.*

(Continued)

*Primary Examiner* — Fadey Jabr
*Assistant Examiner* — Yazan A Soofi

(57) ABSTRACT

A vehicle control system comprising a control device having a plurality of positions, a processing device, and a display device. The control device is configured to transmit data regarding a position of the control device when an object is proximate to the control device. The processing device is configured to receive the data from the control device, identify the control device transmitting the data, and transmit data regarding the first position and identity of the control device. The display device is configured to receive the data from the processing device, visually display a virtual control having a plurality of positions, and allow adjustment of the plurality of positions of the virtual control to at least a second position of the virtual control, wherein the second position is different from the first position.

19 Claims, 2 Drawing Sheets

(56) References Cited

U.S. PATENT DOCUMENTS

| | | | |
|---|---|---|---|
| 2009/0102788 A1* | 4/2009 | Nishida et al. | 345/158 |
| 2010/0214238 A1 | 8/2010 | Christoph et al. | |
| 2011/0082616 A1* | 4/2011 | Small et al. | 701/29 |

FOREIGN PATENT DOCUMENTS

| | | |
|---|---|---|
| DE | 102007054239 A1 | 5/2009 |
| DE | 102008059810 A1 | 6/2010 |
| EP | 1950783 A1 | 7/2008 |

OTHER PUBLICATIONS

International Search Report and Written Opinion dated Oct. 19, 2012, from corresponding International Patent Application No. PCT/US2012/047207.

* cited by examiner

VEHICLE CONTROL SYSTEM

TECHNICAL FIELD

The invention relates generally to apparatus for providing vehicle control information to occupants in a vehicle.

BACKGROUND

Various vehicle devices perform functions in vehicles that are controlled by switches accessible to the driver of a vehicle, otherwise known as vehicle controls. The vehicle controls may include, but are not limited to, analog/mechanical controls and/or switches and digital controls and/or switches where the terms switches and controls are used interchangeably. Some typical vehicle controls may include, without limitation, windshield wiper switches, turn signal switches, radio switches, hazard switches, instrument panel lighting dimmer switches, exterior vehicle lighting switches, vehicle trip computer switches, climate control switches, window defroster switches, heated seat switches, and any other switches known to those with skill in the art. The vehicle controls are typically located on or close to an instrument panel of the vehicle within reach of the driver while seated. For example, the windshield wiper switches and the turn signal switches may be located on control stalks that are located between the steering wheel of the vehicle and the instrument panel. The exterior vehicle lighting switches may also be located on the control stalks or may be positioned on the instrument panel.

Unfortunately, while the driver is sitting in the vehicle, some of the vehicle controls may be partially or completely blocked from the driver's vision. The lack of the ability for the driver to identify the vehicle control may be further complicated when the driver is operating the vehicle because the driver's attention may be focused on the road and not on the vehicle control. Additionally, each vehicle design may be unique where the vehicle controls are differently positioned for each vehicle model. Moreover, as additional vehicle functions are added to vehicles, more corresponding vehicle controls may also be added. These additional vehicle controls may also be positioned in locations that are not easy for the driver to access, identify, or understand how to use.

Therefore, it may be desirable to have the vehicle controls replicated in an alternate location that make it easier for the driver to identify the vehicle controls that the driver may need to access or may be touching. Additionally, it may be desirable to allow the driver or occupants in the vehicle the ability to modify the mode of the vehicle device performing a selected vehicle function from the replicated vehicle control.

SUMMARY

In an embodiment, a vehicle control information system may comprise a control device, a processing device, and a display device. The control device may have a plurality of positions and may be configured to transmit at least data regarding a first position of the control device when an object (e.g., a hand of a driver) is proximate to the control device. The processing device may be configured to receive at least the data regarding the first position from the control device, identify the control device transmitting the data, and transmit at least the data regarding the first position of the control device and identity of the control device. The display device may be configured to receive at least the data regarding the first position and identity of the control device from the processing device, visually display a virtual control having a plurality of positions corresponding to the plurality of positions of the control device, showing at least the first position and identity of the control device, and allow adjustment of the plurality of positions of the virtual control to at least a second position of the virtual control, wherein the second position of the virtual control is different from the first position of the virtual control.

In an embodiment, a vehicle control system for a vehicle may comprise a control device, an audio-capture device, and a processing device. The control device may have a plurality of positions and may be configured to transmit at least data regarding a first position of the control device when a hand of a driver is proximate to the control device. The audio-capture device may be configured to capture audio commands and transmit data containing the audio commands. The processing device may be configured to receive at least the data regarding the first position from the control device, identify the control device transmitting the data, receive the data containing the audio commands from the audio-capture device, match the audio command to a predefined command from a set of predefined commands specified for the control device transmitting the data, and transmit a signal to a vehicle device having a plurality of modes, wherein the signal sets a current mode of the vehicle device based on the audio command when matched with the predefined command.

In an embodiment, a vehicle control system for a vehicle may comprise a control device, a camera, a processing device, and a display device. The control device may have a plurality of positions and may be configured to transmit at least data regarding a first position of the control device. The camera may be configured to capture an image including at least the control device and transmit the image data. The processing device may be configured to receive at least the data regarding the first position from the control device, identify the control device transmitting the data, receive the image data from the camera, determine whether an object (e.g., hand of a driver) is proximate to the control device, and transmit at least the data regarding the first position of the control device and identity of the control device when the hand of driver is proximate to the control device. The display device may be configured to receive at least the data regarding the first position and identity of the control device from the processing device, visually display a virtual control having a plurality of positions corresponding to the plurality of positions of the control device, showing at least the first position and identity of the control device, and allow adjustment of the plurality of positions of the virtual control to at least a second position of the virtual control, wherein the second position of the virtual control is different from the first position of the virtual control.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
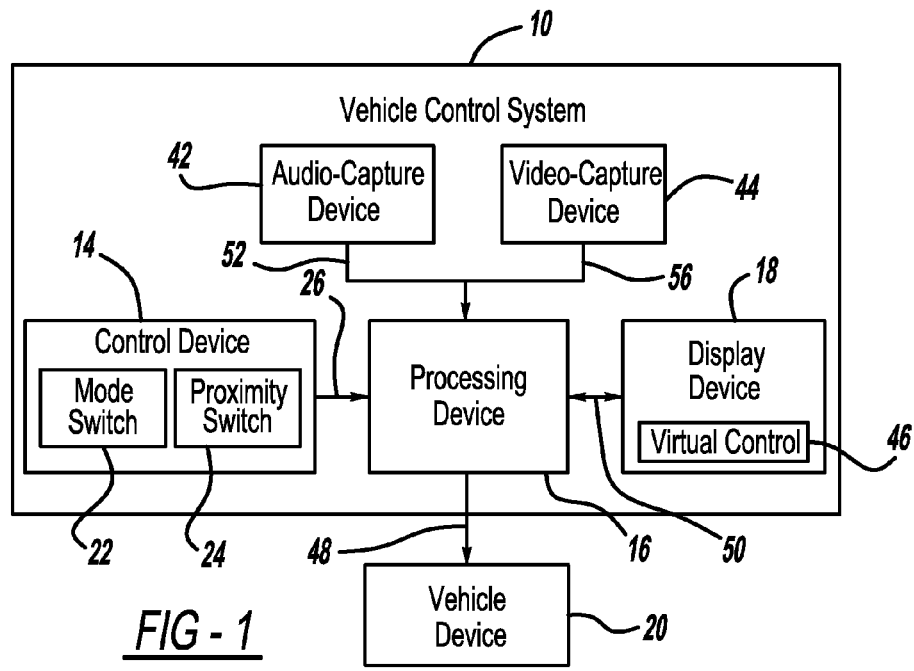
FIG. 1 is a block diagram of an embodiment of a vehicle control system.
Figure 2:
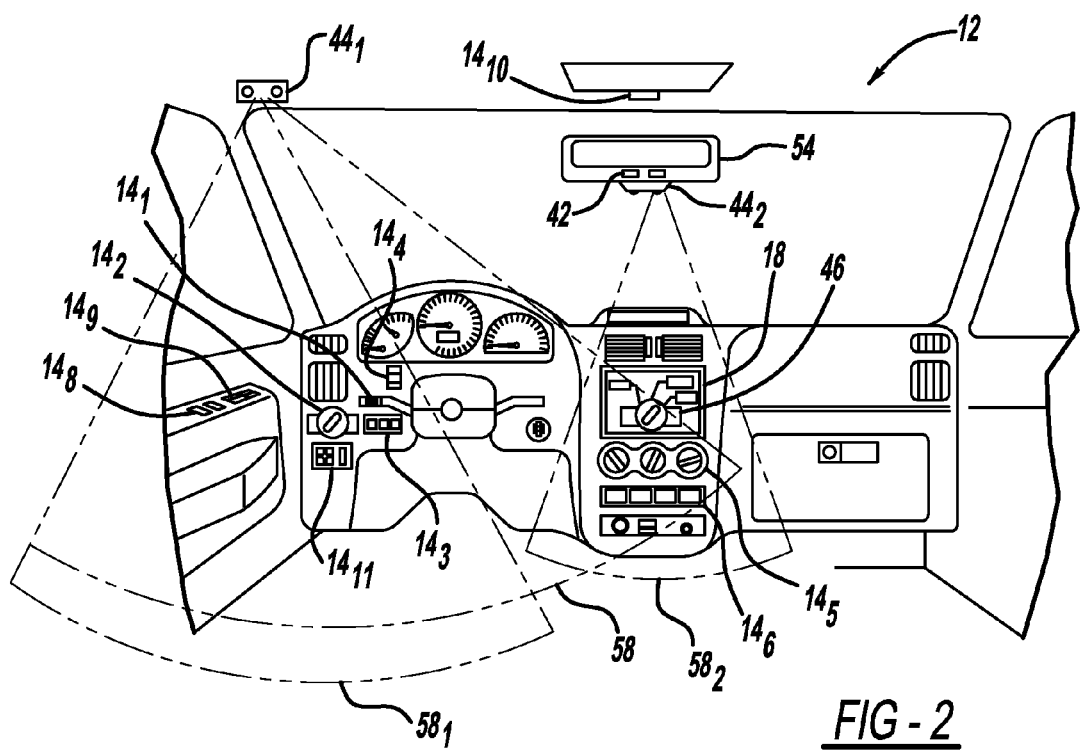
FIG. 2 is a rear perspective view of the interior of a vehicle illustrating an instrument panel with a steering wheel assembly removed, a partial view of a door panel, a partial view of a ceiling, and a rear-view mirror assembly.
Figure 3:
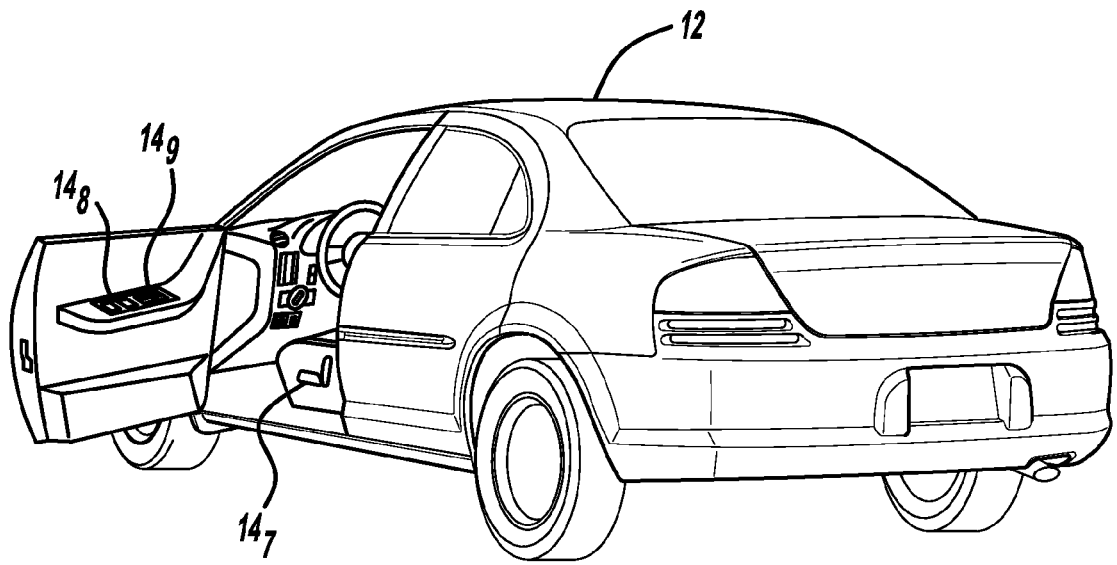
FIG. 3 is perspective view of the side of a vehicle with a driver-side door open showing a partial view of the interior of the vehicle, including a partial view of a driver's seat assembly, a partial view of the driver-side door panel, and a partial view of an instrument panel.
Figure 4:
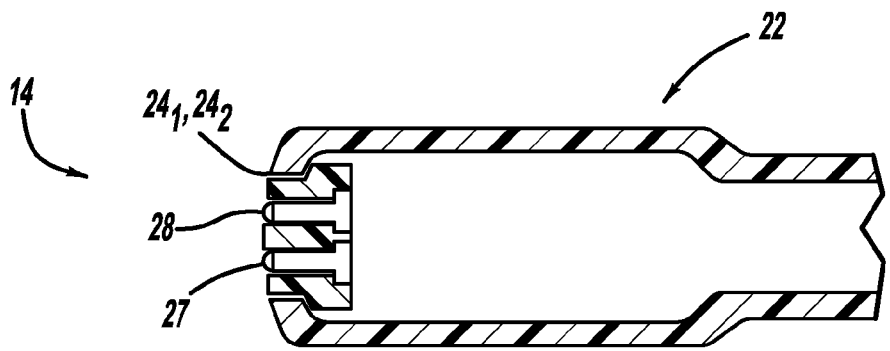
FIG. 4 is partial cross-sectional view of an embodiment of a control device having an infrared proximity sensor.

Referring to FIGS. 1-3, an embodiment of a vehicle control system 10 located in a vehicle 12 may comprise a control device 14, a processing device 16, and a display device 18.

Referring now to FIGS. 1-5, the control device 14 may be configured to set a desired mode of a vehicle device 20. The control device 14 may be located anywhere in the interior of the vehicle 12, such as, but not limited to, an instrument panel assembly, a steering column assembly, a center console assembly, a vehicle seat, a rear view mirror assembly, an overhead console, a sun visor, and a door panel assembly. In an embodiment, the control device 14 may be positioned in the interior of the vehicle 12 such that the control device 14 may be within reach of a hand of a driver sitting in a driver seat in the vehicle 12. As seen in FIGS. 2-3, some examples of various control devices 14 that may set the modes for the related vehicle devices 20 may include, but are not limited to, the windshield wiper switch $14_1$ that may set the speed of a windshield wiper system 20, a vehicle headlamp lighting switch $14_2$ that may turn on or off the vehicle exterior lighting system 20, a first bank of switches $14_3$ that may set various modes of a vehicle information system 20, an instrument light dimmer switch $14_4$ that may set the intensity of the interior lights in the vehicle 20, a climate control switch $14_5$ that may set the various modes of the vehicle's climate control system 20, a second bank of switches $14_6$ that may set the modes of various vehicle functions 20, such as, but not limited to, a vehicle's hazard lights and heated seats, a seat adjustment switch $14_7$ that may set the position for a seat 20 in the vehicle 12, a vehicle lock switch $14_8$ that may set the open/closed mode for the vehicle door locks 20, a vehicle window switch $14_9$ that may set the position for a window 20 of the vehicle 12, a sunroof switch $14_{10}$ that may set the position for a sunroof/moonroof 20 of the vehicle 12, and a mirror adjustment switch $14_{11}$ that may set the position for the side mirrors 20. Although several examples of various control devices 14 have been provided in detail, other control devices 14 and the related vehicle devices 20 may be known to those with skill in the art and may be incorporated into the vehicle control system 10 in accordance with various embodiments of the invention.

The control device 14 may include a mode switch 22 and a proximity switch 24. The mode switch 22 may have a plurality of positions. Each of the plurality of positions may be related to a specific mode of the vehicle device 20. For example, in an embodiment where the control device 14 is the windshield wiper control device $14_1$, the windshield wiper control device $14_1$ may have a position related to an intermittent mode of the windshield wiper vehicle device 20, another position related to a low speed mode of the windshield wiper vehicle device 20, and another position related to a high speed mode of the windshield wiper vehicle device 20. Although various positions of the mode switch 22 of the windshield wiper control device $14_1$ are mentioned in detail, the control device 14 may comprise any number of positions that may be related to any number of modes of the vehicle device 20 in accordance with various embodiments of the invention. The mode switch 22 may be changed from a first position to a second position, where the second position is different than the first position. The position change may be actuated by an object, such as an appendage from any of the occupants in the vehicle, including a hand of a driver. When the mode switch 22 is changed from the first position to the second position, the control device 14 may be configured to send a first signal 26. The first signal 26 may include, but is not limited to, data regarding the first position, data regarding the second position, data regarding the identity of the control device 14, and/or data that the object may be proximate to the control device 14.

The mode switch 22 may be an analog switch or a digital switch as known to those with skill in the art. For example, an analog switch may have a plurality of positions where each position may have a separate electric circuit. One position of the analog switch may be the active position. The active position completes an electrical circuit, or in other words, closes the electric circuit. The remaining non-active positions do not complete their related electric circuits, or in other words, the non-active electric circuits remain open. Additionally, an analog switch may have a plurality of positions where each position has a different electrical resistance, or in other words, variable resistance. Alternatively, a digital switch may have a plurality of positions and may be configured where a change from one position to the next position generates a pulse and a direction of the pulse. The number of pulses and the direction of the pulses may be detected and calculated to determine a delta change in position relative to the active position to adjust the position of the control device 14 from the first position to the second position. Although various embodiments of mode switches 22 are mentioned in detail, the mode switch 22 may comprise any number of various mode switches 22 as known to those with skill in the art and in accordance with various embodiments of the invention.

The proximity switch 24 may detect when the object may be proximate to the control device 14. The proximity switches 24 may open or close an electrical circuit when the object is proximate to the control device 14. The status of the electrical circuit may be used as data that the proximity switch may have detected the object. That data may be transmitted by the control device 14 in the first signal 26.

The proximity switch 24 may be an infrared switch or a capacitive switch as known to those with skill in the art. For example, referring to FIG. 4, an embodiment of the proximity switch $24_1$ may use a passive infrared switch. The passive infrared proximity switch $24_1$ does not generate any auxiliary infrared light. Instead the passive infrared proximity switch $24_1$ may have an infrared sensor 27 that may detect the infrared energy that radiates from any object with a temperature above absolute zero. The infrared sensor 27, such as, but not limited to a phototransistor, of the passive infrared proximity switch $24_1$ may further be configured to focus on a range of infrared energy. For example, the infrared sensor 27 may be calibrated to focus on the range of infrared energy typically emitted from humans. The passive infrared proximity switch $24_1$ may also be configured to detect infrared energy that is only within a predefined distance from the infrared sensor 27 of the passive infrared switch $24_1$. This may allow calibration of the passive infrared proximity switch $24_1$ to detect infrared energy only when the object having a predefined range of infrared energy is within the predefined distance from the infrared sensor 27. For example, the infrared sensor 27 of the passive infrared proximity switch $24_1$ may be configured such that the object must be substantially close to the control device 14 or actually touching the control device 14. As the object having the predefined range of infrared energy is within the predefined distance from the infrared sensor 27, the infrared sensor 27 may detect the infrared energy and the control device 14 may transmit a first signal 26 that the object may have been detected.

In another embodiment, the proximity switch 24 may use an active infrared proximity switch $24_2$. Similar to the passive infrared proximity switch $24_2$, the active infrared proximity switch $24_2$ may have the infrared sensor 27 for detecting infrared energy that radiates from objects. In addition, the active infrared proximity switch $24_2$ may also have an infrared emitter 28 that transmits infrared light. The infrared sensor 27 may detect reflections of the infrared light transmitted by the infrared emitter 28 and determine whether the object may be proximate to the control device 14. The infrared sensor 27 and the infrared emitter 28 may be configured to a specific frequency range to reduce false readings due to background light.

Figure 5:
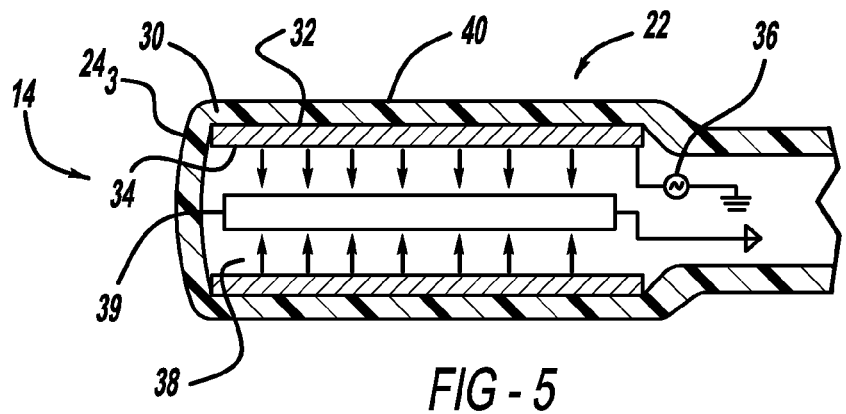
FIG. 5 is a partial cross-sectional view of an embodiment of a control device having a capacitive proximity sensor.

In another embodiment, the proximity switch 24 may use a capacitive proximity switch $24_3$ as seen in FIG. 5. The capacitive proximity switch $24_3$ may detect when the object may be proximate to the control device 14 by detecting minute changes in capacitance around the capacitive proximity switch $24_3$. For example, an insulator 30, such as the wall thickness of a knob on a control device 14, may have an inside surface 32 coated with a conductive layer 34. The inside surface 32 coated with the conductive layer 34 may be the non-visible surface to occupants in the vehicle (otherwise known as a "B-surface" 32). The conductive layer 34 may be charged with a small voltage 36 creating a uniform electrostatic field 38. When an occupant of the vehicle 12 touches an outside surface 40 visible to the occupant (otherwise known as an "A-surface" 40) opposite the B-surface 32 that may be coated with the conductive layer 34, a capacitor may be formed and may disrupt the uniform electrostatic field 38. Any disruption in the uniform electrostatic field 38 may be monitored by a sensor 39 and when the disruption exceeds a predefined tolerance threshold, the control device 14 may be configured to send the first signal 26 having data that the proximity switch 24 may have detected the object.

The proximity switch 24 may be positioned anywhere on the control device 14 where it would be likely to be in contact with the object that may be proximate or actuating the control device 14. For example, the proximity switch 14 may be located substantially close to the mode switch 22. Therefore, when the object is proximate to the mode switch 22 of the control device 14, the proximity switch 24 may detect the presence of the object. In another example, the proximity switch 24 may be integrated with the mode switch 22. As seen in FIG. 5, the mode switch 22 may have a housing or knob configured to act as the insulator 30 that may need to be touched to actuate the mode switch 22 from the first position to the second position. Therefore, in order to actuate the mode switch 22, the object may also be detected by the proximity switch 24. Although an example of an integrated mode switch 22 and proximity switch 24 is provided in detail, the mode switch 22 and proximity switch 24 may comprise various integration designs as known to those with skill in the art and in accordance with various embodiments of the invention.

Referring back to FIG. 1, the processing device 16 is an apparatus configured to receive input data from the control device 14, an audio-capture device 42 (described in more detail below), a video-capture device 44 (described in more detail below), and/or the display device 18, execute instructions, and generate output to either or both, the display device 18 and the vehicle device 20 related to the control device 14 that sent the input data from the first signal 26.

The input data from the control device 14 may include, but is not limited to, data regarding a mode of the mode switch 22 of the control device 14, data regarding whether the proximity switch 24 detected that the object was proximate and/or touching the control device 14, and data regarding the identity of the control device 14. Additionally, the processing device 16 may determine the identity of the control device 14 by identifying the physical connection path from which the processing device 16 received the first signal 26. For example, if a plurality of control devices 14 are connected to the processing device 16, each connection may be identified for a particular control device 14. Upon receiving data from a specific connection, the processing device 16 may also identify the control device 14 that sent the input data via the specific connection.

The processing device 16 may receive input data from the audio-capture device 42 which may include captured audio data regarding audio commands from occupants in the vehicle 12. Upon receiving data from the audio-capture device 42, the processing device 16 may use sound comparison techniques to determine if the captured data may contain predefined audio commands as known to those with skill in the art. For example, the processing device 16 may compare the captured data received from the audio-capture device 42 to predefined audio commands stored in a memory of the processing device 16 to determine what audio commands were spoken by the occupants of the vehicle. In an embodiment, the processing device 16 may be configured to set the position of the control device 14 that sent the signal, set the position of a virtual control 46 (described in more detail below) on the display device 18, and/or set the mode of the related vehicle device 20 based on the audio commands that are recognized. Although an exemplary embodiment of a sound comparison technique is mentioned in detail, any number of various sound comparison techniques as known to those with skill in the art may be used in accordance with various embodiments of the invention.

The processing device 16 may receive input data from the video-capture device 44 which may include captured video image data obtained by the video-capture device 44. The processing device 16 may use the input data containing the captured video images to determine whether the object may be proximate to the control device 14 using video processing techniques as known to those with skill in the art. For example, the captured video-images may be compared to pre-existing images stored in the memory of the processing device 16 and the differences between the two images may be extracted. When the object becomes proximate to the control device 14, the shape of the object may be extracted and the object's position determined. Based on the object's position relative to the known position of the control device 14, the processing device 16 may determine whether the object may be proximate or contacting the control device 14. Although an exemplary embodiment of a video processing technique is mentioned in detail, any number of various video processing techniques as known to those with skill in the art may be used in accordance with various embodiments of the invention.

The processing device 16 may also receive input data from the display device 18 that may include, but not limited to, data regarding the virtual control 42 (described in more detail below) displayed on the display device 18. In embodiments where the display device 18 may be integrated with other components in the vehicle 12, such as, but not limited to, navigational units, radio, DVD players, infotainment systems, and telematic devices, the input data from the display device 18 may also include data relevant to the general function of those components.

The processing device 16 may output to the vehicle device 20, which may determine a mode from the plurality of modes available for the vehicle device 20. The processing device 16 may provide the output to the relevant vehicle device 20 via a second signal 48. For example, when the windshield wiper switch control device $14_1$ is set to a position of low speed, the processing device 16 may set the windshield wiper assembly vehicle device $20_1$ to a mode of low speed via the second signal 48. Although an example of an output to the vehicle device 20 is provided in detail, the output to the vehicle device 14 may comprise various outputs to vehicle devices 20 in accordance with various embodiments of the invention.

In embodiments where the control device 14 is an analog device, the processing device 16 may receive conflicting input data regarding the current position of the analog control device 14 and the current position of the virtual control 46. The processing device 16 may be configured to output the most recent changed position, either received from the analog control device 14 or the virtual control 46, to the related vehicle device 20 in accordance with an embodiment of invention. For example, if the occupant in the vehicle 12 changes the position of the virtual control 46 from the first position to the second position, the processing device 16 may output the mode that corresponds with the second position to the related vehicle device 20 even though the analog control device 14 may still be set on the first position. In this example, the position of the analog control device 14 and the virtual control 46 may be in conflict. The processing device 16 may be configured to match the current position of the virtual control 46 and the corresponding mode of the vehicle device 20 upon the object becoming proximate to the analog control device 14. Although an example of instructions on how the processing device 16 may process conflicting data between the analog control device 14 and the virtual control 46 is mentioned in detail, any number of instructions may be programmed as known to those with skill in the art in accordance with various embodiments of the invention.

The processing device 16 may output to the display device 18 which may determine the current mode of the display device 18, including, but not limited to, what may be currently visible on a screen of the display device 18. The processing device 16 may provide the output to the display device 18 via a third signal 50. For example, the processing device 16 may receive the first signal 26 from the control device 14 where the first signal 26 contains data regarding the identity of the control device 14 and current position of the control device 14. The processing device 16 may then execute instructions based on the data received via the first signal 26. Examples of various instructions may include, but are not limited to, determining the identity of the control device 14, determining which vehicle device 20 is related the identified control device 14, determining whether a second signal 48 should be transmitted to change the mode of the vehicle device 20 to match the corresponding current position of the control device 14 and/or virtual control 46, determining whether a third signal 50 should be transmitted to the display device 18 to visually display the virtual control 46, and/or determining whether a third signal 50 should be transmitted to change the position of the virtual control 46. If the processing device 16 determines that the mode of the vehicle device 20 must be changed, the processing device 20 may then output the necessary second signal 48. Although various examples of instructions are mentioned in detail, other various instructions as known to those with skill in the art may be programmed and used in accordance with various embodiments of the invention.

The processing device 16 may comprise any type of processor or multiple processors, a microprocessor known as a single integrated circuit, a plurality of integrated circuits, and/or any suitable number of integrated circuit devices working in cooperation to accomplish the functions of the processing device 16 as known by those of skill in the art. Circuitry for accomplishing the functions of the processing device 16 and/or implementing the instructions referenced above in a control algorithm can be readily provided by those having ordinary skill in the art after becoming familiar with the teachings herein. The processing device 16 may also comprise a memory component and may store one or more instructions on the memory component. In an embodiment of the invention, the processing device 16 may be integrated with other apparatus existing in the vehicle. For example, embodiments of the processing device 16 may have the processing device 16 integrated with an Electronic Control Module (ECM), a telematic system, or other apparatus with processing capabilities known to those with skill in the art. The processing device 16 may also be a processor dedicated to the vehicle control system 10.

Referring to FIGS. 1-3, the display device 18 may be a user interface that may be configured to send and receive information to and from the driver and/or other occupants in the vehicle 12. The display device 18 may provide audio and/or visual information to the occupants of the vehicle 12. The display device 18 may receive information from the driver and/or occupants of the vehicle by audio or physical input, including, but not limited to voice input, buttons and knobs, and/or touch screens. It will be understood by those of skill in the art that the display device 18 may take many forms in the vehicle 12, including, but not limited to radios, infotainment systems, video displays, navigational systems, and telematic systems. The display device 18 may be connected to the processing device 16 and may receive data from the processing device 16 via the third signal 50 to determine the current mode of operation for the display device 18.

In an embodiment, the display device 18 may have a screen. The screen may be configured to display a plurality of virtual controls 46, where each virtual control 46 from the plurality of virtual control 46 may correspond with the control device 14 that transmitted the first signal 26 to the processing device 16. The virtual control 46 may have a plurality of positions which may correspond to the plurality of positions of the control device 14 that transmitted the first signal 26. Additionally, the virtual control 46 may be configured to display a first position of the virtual control 46 that corresponds with the last known active position of the related control device 14. The occupants in the vehicle 12 may change the position of the virtual control 46 from the first position to a second position, where the second position is different from the first position. In an embodiment when the screen is a touch screen configured to receive input from the occupants in the vehicle 12, the occupants may touch the virtual control 46 displayed on the screen to change the position of the virtual control 46. In another embodiment, the display device 18 may have buttons or knobs which may be configured to change the position of the virtual control 46 that is actively displayed on the screen of the display device 18. In another embodiment, the position of the virtual device 46 may also be changed by audio commands spoken from occupants in the vehicle 12. The display device 18 may be configured to receive data obtained from audio commands which may be captured from the audio-capture device 42 (described in more detail below).

The display device 18 may be configured to enter a teaching mode. The teaching mode may provide information to the occupants in the vehicle 12 regarding the control device 14 last touched or currently being touched by the occupants in the vehicle 12. For example, the screen may be configured to display an illustration of the control device 14 that transmitted the first signal 26. The illustration may include, but is not limited to, a description of the control device 14, a description of each position of the mode switch 22 of the control device 14, instructions on how to change positions of the mode switch 22 of the control device 14, a description of the function of the related vehicle device 20, a description of the plurality of modes of the related vehicle device 20, and/or a picture/illustration representing the location of the control device 14 in the vehicle 12. In addition, the display device 18 may also be configured to provide this information audibly.

Referring to FIGS. 1-2, the vehicle control system 10 may further include the audio-capture device 42 in accordance with an embodiment of the invention. The audio-capture device 42 may be configured to capture audio commands from the occupants in the vehicle 12 and transmit a fourth signal 52 containing data of the captured audio commands to the processing device 16. The audio-capture device 42 may be operably connected to the processing device 16. The audio-capture device 42 may be a microphone or other type of sound capturing device as known to those with skill in the art. In an embodiment, the audio-capture device 42 may be integrated with the telematic system in the vehicle 12, such as, but not limited to, a hands-free cellular phone system. In an embodiment, the audio-capture device 42 may be integrated with the display device 18. In an embodiment, the audio-capture device 42 may be a dedicated device for use with the vehicle control system 10. In an embodiment, the audio-capture device 42 may be positioned in a rear-view mirror assembly 54. Although various embodiments describing the type of sound capturing device and the position of the audio-capture device 42 in the vehicle 12 are mentioned in detail, the type and position of the audio-capture device 42 may include other types of sound capturing devices and positions in the vehicle 12 in accordance with various embodiments of the invention.

Still referring to FIGS. 1-2, the vehicle control system 10 may further include the video-capture device 44 in accordance with an embodiment of the invention. The video-capture device 44 may be configured to capture video images of an area surrounding the control device 14 and transmit a fifth signal 56 containing the data of the video images to the processing device 16. The video-capture device 44 may be operably connected to the processing device 16. The video-capture device 44 may be a video camera, digital camera, infrared camera, or other type image capturing device as known to those with skill in the art. The data containing the video images obtained from the video-capture device 44 may be used to determine if the object may be proximate to the control device 14. The data obtained from the video-capture device 44 may be used as a replacement to the data provided by the proximity switch 24 in the control device 14. Alternatively, the data obtained from the video-capture device 44 may be used in conjunction with the data obtained from the proximity switch 24 in the control device 14. The video-capture device 44 may be positioned anywhere in the interior of the vehicle 12 where a field of view 58 of the video-capture device 44 is configured to include at least one control device 14. The field of view 58 may be large or wide enough to include a plurality of control devices 14. The video-capture device 44 may be positioned near the ceiling of the vehicle 12 with the field of view 58 directed generally downward. In an embodiment as seen in FIG. 2, the video-capture device $44_1$ may be located near an A-pillar of the vehicle 12. In an embodiment as seen in FIG. 2, the video-capture device $44_2$ may be located near the rear-view mirror assembly 54. The video-capture device $44_2$ may also be integrated with the rear-view mirror assembly 54. In an embodiment, a plurality of video-capture devices 44 may be utilized having a plurality of field of views $58_1$, $58_2$ configured to capture video images of different control devices 14. For example, both the video-capture device $44_1$ located near the A-pillar and the video-capture device $44_2$ located near the rear-view mirror assembly 54 may be utilized to obtain the plurality of field of views $58_1$, $58_2$ which may capture video images of different control devices 14. Although various embodiments describing the types and positions of the video-capture device 44 in the vehicle 12 are mentioned in detail, the types and positions of the video-capture device 44 may include other types of image capturing devices and positions in the vehicle 12 in accordance with various embodiments of the invention.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A vehicle control system for a vehicle, the system comprising:
   a control device attached to an instrument panel of the vehicle and having a plurality of user-selectable positions, the control device configured to transmit data regarding a first position of the control device when a hand is proximate to the control device, the control device being additionally configured to control the operation of a corresponding vehicle device by a user's selection of at least one position;
   a vehicle device, configured to be controlled by a person's manipulation of the control device;
   a camera configured to capture an image that includes the control device and a user's hand proximate to the control device, the camera being additionally configured to transmit captured image data, the captured image data comprising image data of the control device and image data of the user's hand proximate to the control device;
   a processing device coupled to the control device, the camera, a plurality of other user-operable control devices attached to a plurality of other interior portions, and coupled to the vehicle device, wherein the processing device is configured to:
receive a first signal from the control device;
receive the captured image data from the camera and determine from said captured image data whether the user's hand is proximate to the control device; and
transmit signals regarding the first position of the control device to both the vehicle device and to a display device; and
a touch-sensitive display device coupled to the processing device, wherein the display device is configured to:
receive from the processing device, signals regarding the first position and identity of the control device;
visually display an illustration of the control device attached to the instrument panel, the illustration of the control device being a virtual control for the vehicle device and a functional replication of the control device attached to the instrument panel, the virtual control having a plurality of user-selectable virtual positions corresponding to the plurality of positions of the control device attached to the instrument panel and showing at least the first position and identity of the control device attached to the instrument panel; and
allow adjustment of the virtual control using the touch-sensitive display to at least a second position of the virtual control, wherein the second position of the virtual control is different from the first position of the virtual control, wherein adjustment of the virtual control to the second position causes a corresponding change in the operation of the vehicle device.

2. The system of claim 1, wherein the first position of the control device is an active position.

3. The system of claim 1, wherein the control device is configured to be operably connected through the processing device to a vehicle device having a plurality of modes, wherein a position of the plurality of positions of the control device is related to a mode of the plurality of modes of the vehicle device, and wherein the display device is operably connected to the vehicle device, wherein a position of the plurality of positions of the virtual control is related to the mode of the plurality of modes of the vehicle device.

4. The system of claim 3, wherein the display device visually displays an explanation of a function of the vehicle device which is related to the control device that transmitted the data.

5. The system of claim 3, wherein the processing device is configured to set a mode from the plurality of modes of the vehicle device based on the most recent data regarding the position of the control device or the virtual control.

6. The system of claim 1, wherein:
the control device is further configured to transmit data regarding a second position of the control device after the control device is adjusted to the second position, wherein the second position of the control device is different from the first position of the control device;
the processing device is further configured to receive data regarding the second position of the control device, generate output regarding a corresponding second position for the virtual control, and transmit output regarding the second position of the virtual control; and
the display device is further configured to receive output regarding the second position of the virtual control and visually display the virtual control showing the second position.

7. The system of claim 1, wherein the control device additionally includes a capacitive proximity switch configured for detecting when a hand is proximate the control device.

8. The system of claim 1, wherein the control device additionally includes an infrared proximity detector, configured to detect when a human hand is proximate the control device.

9. The system of claim 1, wherein the control device includes an analog switch having a plurality of positions related to a plurality of modes of a vehicle device.

10. The system of claim 1, wherein the control device includes a digital switch having a plurality of positions related to a plurality of modes of a vehicle device.

11. The system of claim 1, wherein the adjustment of the position of the virtual control of the display device is performed by touching a predefined portion of the touch screen.

12. The system of claim 1, wherein the display device is further configured to display instructions for adjusting the plurality of positions of the control device.

13. The system of claim 1, wherein the display device is further configured to transmit data regarding the second position of the virtual control after the virtual control has been adjusted from the first position to the second position and wherein the processing device is further configured to receive the data regarding the second position from the display device and adjust a vehicle device, having a plurality of modes and operably connected to the control device, from a first mode to a second mode.

14. A vehicle control system for a vehicle, the system comprising:
a plurality of control devices, each control device having a plurality of positions, wherein each control device is configured to transmit data regarding a first position of the control device when a hand is proximate to the control device;
a plurality of vehicle devices, each vehicle device being configured to be controlled by manipulation of a corresponding control device;
an audio-capture device, wherein the audio-capture device is configured to capture audio commands and transmit data containing the audio commands;
a camera configured to capture an image of a control device, capture an image of a hand proximate to the control device and configured to transmit captured image data, the captured image data representing a captured image of the control device and a captured image of a hand proximate to the control device; and
a processing device coupled to the plurality of control devices, the camera, the plurality of vehicle devices and the audio-capture device, wherein the processing device is configured to:
receive from the audio-capture device at least the data regarding the first position of a control device;
receive the captured image data from the camera and determine from said captured image data whether a hand is proximate to the control device from said captured image data;
identify the control device transmitting the data using the captured image data;
receive the data containing the audio commands from the audio-capture device;
match the audio command to a predefined command from a set of predefined commands specified for the control device transmitting the data; and
transmit a signal to a corresponding vehicle device controlled by the control device transmitting the data, wherein the signal sets a mode of the vehicle device based on the predefined command corresponding to the audio command.

15. The system of claim 14, wherein the audio-capture device is configured to only capture audio commands during a period when a hand is proximate to the control device.

16. The system of claim 14, further comprising a display device, wherein the display device is configured to:
receive at least the data regarding the first position and identity of the control device from the processing device;
visually display an illustration of the control device, the illustration of the control device being a virtual control for the vehicle device transmitting the data and showing at least the first position and identity of the control device; and
wherein the processing device is configured to generate an output regarding a second position of the virtual control based on the predefined command corresponding to the audio command, and transmit an output regarding the second position of the virtual control, and wherein the display device is configured to receive output regarding the second position of the virtual control and visually display the virtual control showing the second position, updating the visual display of the virtual control to show a second position of the virtual control that matches the current mode of the vehicle device based on the audio command when matched with the predefined command.

17. The system of claim 16, wherein the display device is further configured to display text of at least one available audio command from the set of predefined commands specified for the control device transmitting the data.

18. The system of claim 14, wherein the processing device is further configured to transmit a data signal having an audio output which describes at least the identity and function of the control device.

19. A vehicle control system for a vehicle, the system comprising:
a control device attached to an instrument panel of the vehicle, said control device having a plurality of positions, wherein the control device is configured to transmit at least data regarding a first position of the control device;
a vehicle device, configured to be controlled by manipulation of the control device;
a camera, wherein the camera is configured to capture an image including at least the control device, a hand proximate to the control device and transmit image data representing a captured image of said control device and the hand;
a processing device coupled to the control device, the vehicle device and the camera, wherein the processing device is configured to:
receive at least the data regarding the first position from the control device;
identify the control device transmitting the data;
receive the image data from the camera and determine from said image data whether the hand is proximate to the control device; and
transmit at least the data regarding the first position of the control device and identity of the control device when the hand is proximate to the control device; and
a display device coupled to the processing device, wherein the display device is configured to:
receive at least the data regarding the first position and identity of the control device from the processing device;
visually display an illustration of the control device that is proximate the hand, the illustration of the control device being a virtual control for the vehicle device and having a plurality of virtual positions corresponding to the plurality of positions of the control device, wherein the virtual control shows at least the first position and identity of the control device; and
allow adjustment of the plurality of virtual positions of the virtual control to at least a second virtual position of the virtual control, wherein the second virtual position of the virtual control is different from the first position of the virtual control and causes a corresponding change in the operation of the vehicle device.

* * * * *